United States Patent [19]

Clark et al.

[11] Patent Number: 4,888,070
[45] Date of Patent: Dec. 19, 1989

[54] ENVIRONMENTAL SEALING OF A SUBSTRATE

[75] Inventors: Brian Clark, Sunnyvale; William D. Uken, Fremont; Paul Schoenstein, Redwood City; Geary Camin, Los Altos, all of Calif.

[73] Assignee: Raychem Corporation, Menlo Park, Calif.

[21] Appl. No.: 127,342

[22] Filed: Dec. 1, 1987

[51] Int. Cl.[4] .............................................. H01B 13/06
[52] U.S. Cl. ....................................... 156/48; 156/49; 156/51; 174/76; 174/92; 439/279
[58] Field of Search .............. 156/48, 49, 51; 174/76, 174/92; 439/279

[56] References Cited

U.S. PATENT DOCUMENTS

| | | | |
|---|---|---|---|
| 4,600,261 | 7/1986 | Debbaut | 174/76 X |
| 4,610,738 | 9/1986 | Jervis | 156/48 X |
| 4,610,921 | 9/1986 | Follette | 174/84 RX |
| 4,634,207 | 1/1987 | Debbaut | 174/76 X |
| 4,685,683 | 8/1987 | Hall et al. | 277/1 |
| 4,741,940 | 5/1988 | Reed | 156/49 X |

Primary Examiner—Robert A. Dawson
Attorney, Agent, or Firm—Bernard J. Lyons; Herbert G. Burkard

[57] ABSTRACT

Environmental sealing may be achieved by means of a flexible envelope having therein a sealing material having a cone penetration value preferably from 100-350 ($10^{-1}$ mm) and an ultimate elongation of at least 100%. The material is preferably mechanically deformed preferably by shear and preferably causing it to be comminuted.

13 Claims, 1 Drawing Sheet

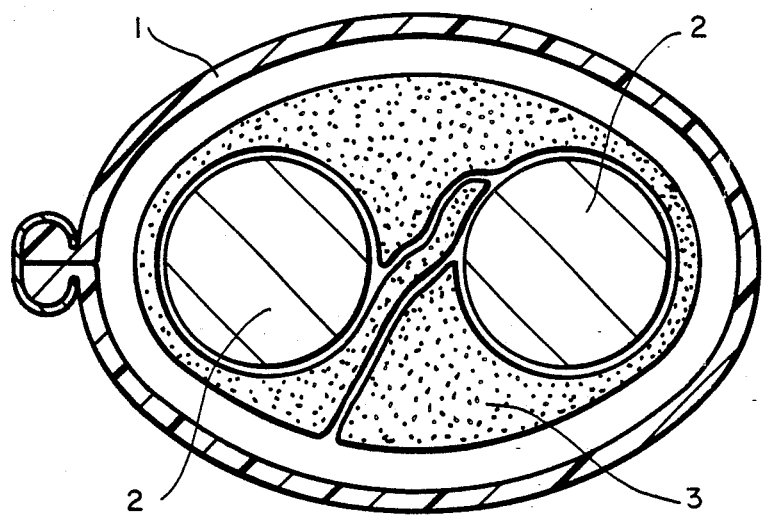
FIG_1

ENVIRONMENTAL SEALING OF A SUBSTRATE

BACKGROUND OF THE INVENTION

The present invention relates to environmental sealing of substrates in the electrical, electronics, telecommunications, power and related industries, particularly to sealing of electrical terminals or other contacts and wire splices.

An environmental seal may be provided in many ways. For example, the substrate to be sealed may be sealed by surrounding it with some sealed box or other enclosure, it may be tape wrapped, it may be painted or it may be coated or surrounded with bulk sealing composition. The present invention is preferably concerned with what may now perhaps be regarded as a combination of two of these techniques. Such sealing may be provided to protect the substrate from various contaminants, and in the case of electrical contacts particularly from water.

A problem arises in providing environmental protection due to an inherent conflict between the desire for ease of installation of the sealing means, and tightness of the final seal. This problem is often overcome by having the sealing means undergo some change in physical condition, for example a paint may be applied as a liquid that subsequently solidifies. An alternative is the provision of a thermoplastic material, such as a hot-melt adhesive, that may be softened or melted and then applied to the substrate and allowed to solidify. Another example is a curable composition that in its pre-cured state has a low viscosity allowing it to be poured in place around the substrate, after which it is caused to cure.

For many applications, dimensionally heat-recoverable articles are used to provide rugged, long-lasting environmental seals. Such an article may be supplied in an expanded, enlarged, form in which it is positioned loosely around the substrate and then heated to cause it to shrink into tight engagement with the substrate.

Recently it has been proposed to provide an environmental seal by means of a sealing material that is supplied pre-cured in some form of container which is then fixed relative to the substrate so that the sealing material is held under pressure against a surface of the substrate to be sealed. This technique may be contrasted with one where a sealing material in an uncured form is poured into a container to surround the substrate and is then cured in situ. Pre-curing has many advantages, particularly ease and speed of installation in the field.

An apparatus for providing environmental sealing in this way is disclosed and claimed in U.S. Pat. No. 4,600,261 (Debbaut), the disclosure of which is incorporated herein by reference. That patent discloses a protection apparatus comprising:
(a) an insulating gel characterized by
  (1) a cone penetration value from approximately 150-350 ($10^{-1}$ mm);
  (2) an ultimate elongation of at least approximately 200%;
  (3) a maximum tensile strength of approximately 20 psi;
  (4) a cohesive strength greater than its adhesive strength;
(b) first means to contain said gel;
(c) second means to retain said gel within said first means; and
(d) force means which acts on said first means so that said gel is maintained in compressive contact with said electrical contact and substantially encapsulates a conductive portion of said electrical contact, whereby upon release of said force means and a disengagement of said first means from said electrical contact, said gel remains substantially within said first means.

U.S. Pat. No. 4,634,207, the disclosure of which is incorporated herein by reference, discloses an apparatus for protecting a substrate, comprising
(a) a gel, the gel being cured prior to coming into contact with any part of the substrate to be protected, the gel having a cone penetration value of 100-350 ($10^{-1}$ mm) and an ultimate elongation of at least 200%; and
(b) means for deforming the gel into close and conforming contact with the substrate.

Also disclosed is a process for protecting a substrate, comprising the steps of:
pressing together a substrate to be protected and an apparatus comprising a support member, a gel located on the support member, the gel being cured prior to coming into contact with any part of the substrate, the gel having a cone penetration value of 100 to 350 ($10^{-1}$ mm) and an ultimate elongation of at least 200%, and means for deforming the gel into close and conforming contact with the substrate, the apparatus and the substrate being pressed together so that the gel contacts the substrate and is deformed into close and conforming contact therewith.

The use of sealing materials for environmental protection is also disclosed in the following patents, the disclosures of each of which are incorporated herein by reference: U.S. Pat. No. 4,643,924 (Uken et al.), U.S. Pat. No. 4,690,831 (Uken et al.), U.S. Pat. No. 4,581,265 (Follette), U.S. Pat. No. 4,610,910 (Follette), U.S. Pat. No. 4,610,738 (Jervis), U.S. Pat. No. 4,600,804 (Howard), U.S. Pat. No. 4,701,574 (Shimirak), U.S. Ser. No. 901,971 filed 29 August 1986 (Dubrow), now abandoned, equivalent to EP-A-0194872, U.S. Ser. No. 859,171 filed 29 May 1986 (Kayser), now abandoned, equivalent to EP-A-0225370, U.S. Pat. No. 4,662,692 (Uken et al.), U.S. Pat. No. 4,647,717 (Uken), U.S. Ser. No. 767,555 (Story), now abandoned, filed Aug. 20, 1985 equivalent to EP-A-0213874, U.S. Ser. No. 801,018 (Gamarra), now U.S. Pat. No. 4,716,183, filed Nov. 22, 1985 equivalent to EP-A-0224389, and U.S. Ser. No. 945,219 (Chang), now abandoned filed Dec. 22, 1986 equivalent to EP-A-0174165.

Cone penetration values in the above-mentioned specifications are unless the context otherwise requires or states, and are in this specification, expressed in units of $10^{-1}$ mm and are measured by ASTM D217-68 at 70° F. (21° C.) on an undisturbed sample using a standard 1:1 scale cone (cone weight 102.5 g, shaft weight 47.5 g), the penetration being measured after 5 seconds.

Ultimate elongation values in the above-mentioned specifications are unless the context otherwise requires or states, and are in this specification, as measured according to the technique of ASTMD 638-80 at 70° F. (21° C.) using a type 4 die to cut the sample and at a speed of 50 cm/minute.

U.S. Pat. No. 4,685,683 (Raychem), the disclosure of which is incorporated herein by reference, discloses a method of forming a seal between at least one elongate object and a surface surrounding the or each object, which comprises:
  (a) positioning between the object and the surface a flexible envelope containing a void-filling composition which is capable of undergoing a change from a state of lower viscosity to a state of higher viscosity;
  (b) deforming at least part of the envelope thereby causing the void-filling composition to conform to the object and to the surface; and
  (c) causing said change from lower viscosity to higher viscosity.

The void filling composition may, for example, be a thermosetting or thermoplastic material or a two-part curing system.

A problem can arise in difficult circumstances with the above prior art sealing method. That problem may arise where the substrate is of a complex shape since it may then be difficult to cause the void-filling composition and envelope fully to conform to all surfaces of the substrate, without excessive pressure or without high temperature. Alternatively, if the composition is initially of very low viscosity it may not achieve the desired high viscosity. Also, curing systems are often impractical to use.

We have now found that the performance of such an envelope can be improved by using on the void-filling composition a material that may be referred to as a gel, particularly one that has been subjected to mechanical deformation for example by shear. The material may be directed to the position where it is required, by for example extrusion through a nozzle into the envelope, or by deformation of the envelope. The step of extrusion itself may provide the desired mechanical deformation. We have found that the flow properties of the material may be suitably altered by this deformation, but that it is able, where necessary, afterwards to cohere or to "knit" back together again, retaining a sufficient ultimate elongation or other property required during its service life.

SUMMARY OF THE INVENTION

Thus, the invention provides a method of environmentally protecting a substrate, which comprises:
  (a) providing (preferably at ambient temperature) an envelope containing a sealing material having an ultimate elongation according to ASTMD 638-80 of at least 100% and a cone penetration according to ASTM D217-68 at 21° C. of greater than 100 $(10^{-1}$ mm);
  (b) deforming at least part of the envelope thereby causing the material to conform to the substrate; and
  (c) optionally subjecting (preferably at ambient temperature) the material to a shear force greater than its cohesive strength.

The material is preferably subjected to shear before being put in the envelope. Alternatively, it may be subjected to shear while in the envelope, possibly simultaneously with said step (b).

Deformation of the envelope may be by any suitable means, including mechanical deformation, deformation by hand, and deformation by fluid pressure, for example by injecting the sealing material into it.

The material and the shear process are preferably such that substantially no shear heat is generated.

The sealing material is preferably at least partially cross-linked, for example at least 0.01 to 6 cross-links per weight average molecule, more preferably 0.5 to 4, especially 0.5 to 2 cross-links.

The effect of shear or other deformation in improving the way in which such materials conform to the substrate was quite unexpected. Shear preferably causes the material to be fragmented, which ma be regarded as causing comminution, fracture, or brecciation, or chopping, depending on the size and size distribution of resulting particles. Small particles are preferred.

The mechanical deformation of the material is preferably carried out by forcing it through a mesh or by milling it (for example between steel rollers) or by chopping it with a blade or wire in the presence of a solvent or suspending medium. The effect that this has on the material may be regarded as comminution. Its flow properties are thereby improved. In the case of gels as referred to above, the resulting material may be regarded as an agglomeration of particles, each comprising a cross-linked network containing an uncross-linked or liquid component, the particles being loosely interconnected by adhering together, possibly by autoadhesion. Before the mechanical deformation the material may be regarded as a single cross-linked network containing the uncross-linked or liquid component. This change may be reflected in an increase in it $G''$ value, $G''$ being its loss modulus as determined by dynamic spectroscopy. The material may then be directed as desired by extrusion etc.

We have found also that advantageous sealing materials, particularly for the installation techniques disclosed herein, have a lower stress relaxation than that of otherwise similar prior art gel.

Thus, the invention also provides a flexible envelope having therein a sealing material which has:
  (a) an ultimate elongation according to ASTM D638-80 of at least 100%;
  (b) a cone penetration value of at least 150 $(10^{-1}$ mm); and
  (c) optionally a stress relaxation time, being the time at which the stress relaxation ratio is $e^{31\ 1}$, of less than 900 seconds.

Stress relaxation is to be performed at 23° C. for 1 hour using a dynamic spectrometer (such as Rheometrics RDS-770, trade mark) in the transient parallel plate mode. A stress relaxation ratio may be defined as the ratio of the stress, or modulus, $G(T)$, at time t divided by peak stress achieved when the strain is applied at time $t=0$. The stress relaxation time is therefore the time at which the stress relaxation ratio is equal to $e^{-1}$, i.e. 0.368; $e^{-1}$ describing the exponential decay of an idealized stress relaxation curve.

We prefer that the sealing material has a stress relaxation time of less than 800 seconds, more preferably less than 700 seconds, particularly less than 500 seconds.

Sealing material may be supplied in any convenient way. For some uses the material may be extruded from a material-dispensing gun, and the invention therefore further provides a cartridge (optionally a disposable cartridge) having therein a cured material having an ultimate elongation of at least 100% according to ASTM D638-80 and a cone penetration value of 150-350 $(10^{-1}$ mm).

The sealing material may be supplied in a flexible envelope that provides one or more of the following:
  (a) means for containing the material prior to use;
  (b) means for physically deforming the material by shear or otherwise;

(c) means for directing the material by extrusion or otherwise to its desired position;

(d) means for locating the material around a substrate to be protected; and (e) means for maintaining the sealing material under pressure against a surface of the substrate.

The sealing material used in the envelope preferably has one or more of the following properties.

Cone Penetration

The cone penetration of the material before use is preferably greater than 100, more preferably greater than 150, particularly greater than 170, especially greater than 200 ($10^{-1}$ mm). It is preferably less than 400, more preferably less than 350, especially less than 300 ($10^{-1}$ mm).

Ultimate Elongation

The ultimate elongation of the material before use is preferably greater than 50%, more preferably greater than 100, particularly greater than 200%, more particularly greater than 300%.

Storage Modulus (G')

Storage modulus of the material before use is determined by dynamic spectroscopy (using for example a Rheometrics RDS-7700, trade mark) measured at 24° C. on a 25 mm diameter disc at 1 Hz frequency. G' is preferably less than $10^7$ dynes/cm$^2$, more preferably less than $5 \times 10^6$ dynes/cm$^2$, particularly less than $10^6$ dynes/cm$^2$, especially less than $5 \times 10^5$ dynes/cm$^2$.

Tan Delta

Tan delta of the material before use is the ratio between the loss modulus (G'') and the storage modulus (G'), each in dynes/cm$^2$, each determined by dynamic spectroscopy. Tan delta is preferably less than 1, i.e. the storage modulus is preferably greater than the loss modulus. More preferably tan delta is less than 0.8, particularly less than 0.7.

Stress Relaxation Time

For the material after deformation, this is preferably less than 900 seconds, more preferably less than 700 seconds, particularly less than 500 seconds, especially less than 200 seconds. Preferably it is greater than 10 seconds, particularly greater than 50 seconds. It is desirable that the material relax as fast as possible initially (so that the material can easily surround a substrate) and then not relax further, so that it can be put and remain under compression.

Tack

The sealing material before and after deformation is preferably tacky, more preferably has high tack.

The means for mechanically deforming and for dispensing the sealing material preferably have one or more of the following characteristics.

The material and the means for dispensing are preferably such that the material can be dispensed under a pressure of less than 3000 psi, more preferably less than 2000 psi, particularly less than 1500 psi, particularly less than 1000 psi, more particularly less than 500 psi.

The flow rate of the material from the means for dispensing is preferably greater than 0.01 grams per second, more preferably greater than 0.1 grams per second, particularly greater than 1.0 grams per second, especially greater than 10 grams per second.

The means for deforming the material is preferably a mesh, grid or other perforate structure. Preferably the structure is, or is equivalent to, the size of 50 mesh (holes per inch) or finer, more preferably 70 mesh or finer, particularly 100 mesh or finer, more particularly 150 mesh or finer.

The material is preferably extruded through a nozzle of diameter greater than 0.075 cms, preferably greater than 0.1 cm, preferably greater than 0.2 cm. A smaller nozzle helps to stick the particles of comminuted material back together.

The nozzle land preferably has a length of at least 1 cm, more preferably at least 2 cm, particularly at least 3 cm. The land through which the material passes after deformation helps to cause pressure or flow orientation or gives the material time to relax some of its original memory before pressure reduction.

BRIEF DESCRIPTION OF THE FIGURE

FIG. 1 shows a cable splice sealed by a recoverable sleeve and an envelope of the invention.

DETAILED DESCRIPTION OF THE FIGURE

FIG. 1 shows in cross-section a wrap-around heat recoverable sleeve or other housing around a branching pair of cables 2. The housing is shown separated from the cables for clarity. It can be seen that there is a concave area between the cables and the housing that is difficult to seal. The envelope 3 containing the gel sealing material is able to be deformed to conform to the cables and housing. Shear or other deformation of the gel allows the envelope to conform to highly intricate shapes.

The sealing material is usually electrically insulating (i.e. has a resistivity of at least $10^9$ ohm.cm), but is not necessarily so for some possible uses of the invention, e.g. when non-electrical substrates are being protected. Suitable sealing materials include materials made by gelling curable polyurethane precursor materials (as described for example in the patents referenced above in the presence of substantial quantities of a mineral oil, a vegetable oil or a plasticizer, or a mixture of two or more of these. Thus we have obtained excellent results using sealing materials prepared by gelling components which are commercially available for the preparation of polyurethane gels in situ, the gelation being carried out, however, in the presence of a suitable amount, e.g. 30 to 70% by weight, of a suitable plasticizer, e.g. a trimellitate, or in the presence of a suitable animal or vegetable oil, e.g. 80 to 60%, preferably 80 to 70%, by weight of a mixture of mineral and vegetable oils in which the ratio by weight of mineral oil to vegetable oil is 0.7 to 2.4. Suitable sealing materials can also be prepared by curing reactive silicones with non-reactive extender silicones, and the invention includes the use of any sealing material having the desired cone penetration and elongation values. The sealing material may contain known additives such as moisture scavengers (e.g. benzoyl chloride), antioxidants, pigments and fungicides. The sealing material is preferably hydrolytically stable, moisture-insensitive, and substantially inert towards the substrate.

We claim:

1. A method of environmentally protecting a substrate which comprises:

(a) providing an envelope containing a sealing material having as ultimate elongation according to ASTM D638-80 of at least 100% and a cone penetration according to ASTM D217-68 at 21° C. of greater than 100 (10⁻¹ mm);

(b) deforming at least a part of the envelope thereby causing the envelope and the material contained therein to conform to the substrate; and (c) optionally subjecting the material to a shear force greater than its cohesive strength.

2. A method of environmentally sealing a substrate which comprises:

(a) providing a sealing material having an ultimate elongation according to ASTM D638-80 of at least 100% and a cone penetration according to ASTM D217-68 at 21° C. of greater than 100 (10⁻¹ mm);

(b) providing a flexible envelope around the substrate;

(c) subjecting the material to shear; and (d) placing the material into the envelope such that envelope surrounds and conforms to the substrate.

3. A method according to claim 2, in which:

(a) the material is subjected to shear;

(b) the envelope is provided around the substrate; and (c) then the material is placed into the envelope.

4. A method according to claim 2, in which:

(a) the material is subjected to shear;

(b) then the material is placed into the envelope; and (c) then the envelope with the material therein is positioned around the substrate.

5. A method according to claim 1, in which the material has a cone penetration value of at least 150 (10⁻¹ mm).

6. A method of environmentally protecting a substrate which comprises:

(a) providing an envelope containing a sealing material having as ultimate elongation according to ASTM D638-80 of at least 100% and a cone penetration according to ASTM D217-68 at 21° C. of greater than 100 (10⁻¹ mm);

(b) deforming at least a part of the envelope thereby causing the material to conform to the substrate; and (c) subjecting the material to a shear force greater than its cohesive strength;

whereby the material after subjection to shear has a stress relaxation time, being the time at which the stress relaxation ratio is equal to e⁻¹, of less than 900 seconds.

7. A method of environmentally protecting a substrate which comprises:

(a) providing an envelope containing a sealing material having as ultimate elongation according to ASTM D638-80 of at least 100% and a cone penetration according to ASTM D217-68 at 21° C. of greater than 100 (10⁻¹ mm);

(b) deforming at least a part of the envelope thereby causing the material to conform to the substrate; and (c) optionally subjecting the material to a shear force greater than its cohesive strength;

wherein the material provided has a tan delta value, being the ratio of loss modulus to storage modulus as determined by dynamic spectroscopy, of less than 1.

8. A method of environmentally protecting a substrate which comprises:

(a) providing an envelope containing a sealing material having as ultimate elongation according to ASTM D638-80 of at least 100% and a cone penetration according to ASTM D217-68 at 21° C. of greater than 100 (10⁻¹ mm);

(b) deforming at least a part of the envelope thereby causing the material to conform to the substrate;

in which the material is subjected to shear by passing it through a perforate structure or by milling.

9. A method of environmentally protecting a substrate which comprises:

(a) providing an envelope containing a sealing material having as ultimate elongation according to ASTM D638-80 of at least 100% and a cone penetration according to ASTM D217-68 at 21° C. of greater than 100 (10⁻¹ mm);

(b) deforming at least a part of the envelope thereby causing the material to conform to the substrate;

in which the material is forced through a nozzle and land such that the material is oriented under pressure.

10. A method of environmentally protecting a substrate which comprises:

(a) providing an envelope containing a sealing material having as ultimate elongation according to ASTM D638-80 of at least 100% and a cone penetration according to ASTM D217-68 at 21° C. of greater than 100 (10⁻¹ mm);

(b) deforming at least a part of the envelope thereby causing the material to conform to the substrate; and (c) optionally subjecting the material to a shear force greater than its cohesive strength;

in which the material is mechanically deformed in such a way as to increase its G″ value, G″ being its loss modulus as determined by dynamic spectroscopy.

11. A method of environmentally protecting a substrate which comprises:

(a) providing an envelope containing a sealing material having as ultimate elongation according to ASTM D638-80 of at least 100% and a cone penetration according to ASTM D217-68 at 21° C. of greater than 100 (10⁻¹ mm);

(b) deforming at least a part of the envelope thereby causing the material to conform to the substrate; and (c) optionally subjecting the material to a shear force greater than its cohesive strength;

in which the material provided is crosslinked.

12. A method according to claim 1, in which the substrate comprises an electrical terminal or wire splice.

13. A method according to claim 1, which additionally comprises maintaining the envelope and the material contained therein under pressure against the substrate.

* * * * *